US00RE34585E

United States Patent [19]

Schmidt, Jr. et al.

[11] E Patent Number: Re. 34,585

[45] Reissued Date of Patent: Apr. 19, 1994

[54] PIVOTING HOSE STORAGE REEL AND MOUNTING THEREOF

[75] Inventors: Ronald L. Schmidt, Jr., Hinsdale; Timothy G. Mayer, Metamora, both of Ill.

[73] Assignee: Peabody Myers Corporation, Streator, Ill.

[21] Appl. No.: 967,552

[22] Filed: Oct. 27, 1992

Related U.S. Patent Documents

Reissue of:

[64] Patent No.: 4,896,686
Issued: Jan. 30, 1990
Appl. No.: 264,834
Filed: Oct. 31, 1988

U.S. Applications:

[63] Continuation of Ser. No. 681,114, Apr. 5, 1991, abandoned.

[51] Int. Cl.[5] ..... B08B 9/06

[52] U.S. Cl. ..... 134/167 C; 239/197; 254/134.3 FT; 254/323; 254/332

[58] Field of Search ..... 134/167 C, 168 C; 15/104.33, 315; 254/323, 325, 326, 327, 329, 332, 134.3 R, 134.3 FT; 239/175, 195, 197

[56] References Cited

U.S. PATENT DOCUMENTS

| | | | |
|---|---|---|---|
| 2,766,966 | 10/1956 | Roesler | 254/326 |
| 3,027,141 | 3/1962 | Ellis | 252/323 |
| 3,658,589 | 4/1972 | Shaddock | 134/168 C X |
| 3,829,064 | 8/1974 | Jackson | 254/323 |
| 4,199,837 | 4/1980 | Fisco | 134/168 C X |
| 4,650,163 | 3/1987 | Peterson | 254/327 |
| 4,838,302 | 6/1989 | Prange | 137/355.12 |

*Primary Examiner*—Philip R. Coe
*Attorney, Agent, or Firm*—John G. Gilfillan, III

[57] ABSTRACT

A method and apparatus for supporting a hose storage reel and mounting it to a vehicular platform to allow a high degree of rotational and lateral positioning alignment of hose dispensal to and retrieval from a selected dispatch point.

45 Claims, 6 Drawing Sheets

PIVOTING HOSE STORAGE REEL AND MOUNTING THEREOF

Matter enclosed in heavy brackets [ ] appears in the original patent but forms no part of this reissue specification; matter printed in italics indicates the additions made by reissue.

*This is a continuation Reissue application of co-pending Reissue application Ser. No. 07/681,114 filed on Apr. 5, 1991, now abandoned.*

BACKGROUND OF THE INVENTION

The present invention relates to portable discharge hose storage reel systems, and more particularly to methods and apparatus for supporting a discharge hose storage reel and mounting it to a vehicular support platform.

Vehicularly mounted discharge hoses, stored on hose reels, are used extensively with sewer cleaning vehicles utilizing water streams for cleaning sewer laterals. Such sewer cleaning vehicles generally include a large capacity water reservoir and a water pump supplied by the reservoir for developing a flow of water through a discharge hose which feeds a water nozzle. The water nozzle often has outlets which eject sprayed water generally rearward toward the connecting discharge hose, so that the water spray propels the nozzle through any passageway in which it is inserted, typically sewer laterals connecting catch basins in a sewer system.

The discharge hose unwinds from a discharge hose storage reel as the water nozzle propels itself through a sewer pipe lateral passage. These hose reels are large and heavy, because as much as 1,000 feet of 1 inch diameter flexible hose may be required for extended sewer laterals. Because of its size and weight, such a hose reel is generally mounted across the nose or tail of its associated vehicle, so that the hose dispenses from either the left or right side of the vehicle along its nose or tail. U.S. Pat. No. 3,658,589, assigned to the assignee of the present invention, depicts one such hose reel mounted across the nose of the vehicle. One U.S. company, Aquatech, provides, under the designation Model SJ-1500, a hose reel mounted at the tail of the vehicle. In some other instances, with the hose reel mounted on the tail of the vehicle in an arrangement having the axis of rotation of the reel lying perpendicular to the center line of the vehicle, the hose may be dispensed from the forward or rearward portion of the reel. Alternatively, the hose reel can be placed amidship within the vehicle, and according to one arrangement, the reel slides toward the left or right side of the vehicle for the dispensal and retrieval of hose. Such an arrangement is sold in the U.S. by Leach under the registered trademark VAC-ALL. Another arrangement with amidship, mounting transports the discharge hose to the front of a vehicle with a boom, much like a fishing pole transports fish line. This arrangement is sold in the United States by IPM, Inc., under the model designation SCAVENGER.

Other arrangements have includes a nose or tail mounted hose storage reel which swings about one side of its mounting to allow the reel to extend away from the vehicle. The swiveling arrangement allows the reel to dispense and retrieve hose over a wider degree of vehicle position, because the reel position can be adjusted to compensate for a certain amount of variation of vehicle position. For example, an arrangement where the hose storage reel mounted to the tail of a vehicle is found on the vehicles manufactured by Aquatech and sold under the designation B5, B10, and B15. Myers-Sherman Company, predecessor to the assignee of the present invention, manufactured in about 1968 a comparable arrangement in which a nose mounted hose storage reel could swing about one side of its mounting to allow the reel to extend away from the vehicle. Still another arrangement allows the hose reel to swing downward along one side of its mount to allow cab or hood raising clearance for vehicle maintenance.

The hose reel mounting arrangements described above all provide limited, if any, degree of alignment for hose dispensal to and retrieval from a catch basin or a manhole associated with catch basins, sewer laterals, or sewer lines. Furthermore, most of these arrangements limit hose dispensal and retrieval to one selected side of the vehicle, typically the right side. Those arrangements which allow the hose reel to swing outward for alignment may extend beyond the vehicle, and may thereby create clearance problems and possible road hazards. Furthermore, such swinging hose reel mounts can be unstable, and may require jacks or other support arrangements along their extended sides for suitable stability.

OBJECTS OF THE INVENTION

Accordingly, one object of the present invention is to mount and support a discharge hose storage reel from a vehicular platform with a large degree of hose dispensal and retrieval alignability with a stationary dispatch point.

Another object of the invention is to mount and support a discharge hose storage reel for hose dispensal and retrieval with equal ease from both sides of the vehicular platform.

Still another object of the invention is to minimize protrusion of a discharge hose storage reel from the vehicular platform to which it is mounted.

Yet another object of the invention is to maximize vehicular stability with a vehicularly mounted discharge hose storage reel.

These and other objects and advantages of the present invention will be apparent from the description of the invention set forth below and in the appended claims.

SUMMARY OF THE INVENTION

The above described objects, as well as other advantages described below in connection with the detailed description of the preferred embodiment, are obtained with a method and apparatus for supporting a water discharge hose storage reel for a sewer cleaning vehicle which is rotatable about a support axis which transversely intersects the hose reel axis of rotation between the ends of the hose reel. Because the hose reel has its axis of rotation generally parallel to the ground to prevent spillage of hose from the reel, the support axis is substantially transverse to the ground to let the hose reel symmetrically pivot about the support axis. Because the symmetrical rotatability of the hose reel permits dispensal and retrieval of its hose over a large proportion of its rotation, limited only by the physical obstruction of the vehicle to which it is mounted, the degree of alignment for hose dispensal and retrieval with a selected dispatch point is high. The degree of alignability may be enhanced by telescoping the hose reel support axis a selected distance away from the vehicle to which the hose reel is mounted.

Since the support axis for the hose reel may be mounted very close, or even abutting, the surface of the vehicle to which it is mounted, particularly if the telescoping mounting arrangement described above is incorporated, the hose reel may be easily mounted on the nose or tail of the vehicle with little overhang or support imbalance.

DESCRIPTION OF THE PREFERRED EMBODIMENT

Figure 1:
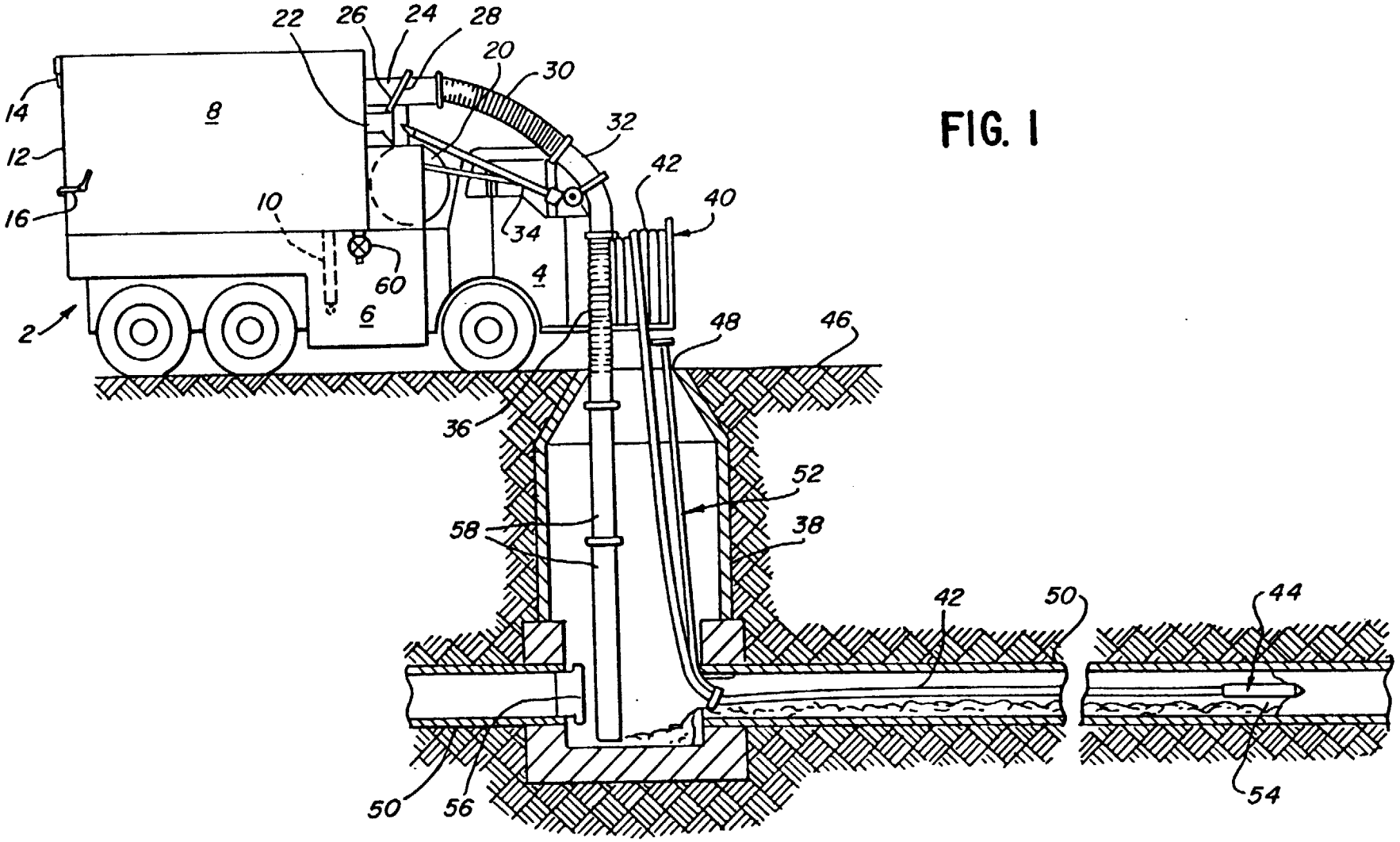
FIG. 1 is a side view of a catch basin and sewer cleaning vehicle which incorporates the prior art hose storage reel and is included to describe generally the catch basin and sewer cleaning operation.

Referring to the drawings, wherein like references characters designate like or corresponding parts throughout the views, FIG. 1 illustrates a typical catch basin and sewer cleaning vehicle 2 having its nose end positioned over a catch basin. The vehicle 2 is typically an internal combustion engine propelled truck with a driver's cab 4, a large water tank 6 mounted rearwardly of the cab 4 and extending between and over the rear wheels of the vehicle 2, and a large closed container 8, such as a large sealable tank, over the water tank 6 and pivotably mounted on the chassis of the vehicle 2 so as to be raised to a dumping position with, typically, a lift mechanism 10, such as a hydraulic or scissors lift operated in the conventional manner. A rear wall 12 of the container 8 is swingable from a top hinge 14 to allow the contents of the container 8 to be easily discharged or dumped when the lift mechanism 10 tips the body of the container 8. The rear wall 12 is sealingly clamped to the container 8 in its closed position by means of latches 16 and the like so that the interior of the container 8 will maintain a vacuum.

An auxiliary engine 18 is mounted on the vehicle 2 behind the cab 4 and drives an exhaust fan 20, pulling air out of the container 8 through a fan duct 22 to create a reduced pressure or vacuum in the container 8. Alternatively, the exhaust fan 20 may be driven by a power take-off from the vehicle engine. An inlet duct 24 at the top front end of the container 8 has an inclined front end face 26 which mates with a pipe face 28 on the end of a flexible pipe 30 extending forwardly over the cab 4 to a curved pipe section 32 which is supported from a swinging boom 34 and carried by the vehicle 2. The boom 34 can swing horizontally and vertically to position a flexible conduit 36 depending from the curved pipe section 32 over a catch basin 38. A hose reel 40 is mounted on the end of the cab 4 and a flexible discharge hose 42 is wound on the hose reel 40. The discharge hose 42 may be equipped with a self-propelling spray nozzle 44 on its leading end.

At the start of a sewer cleaning operation, the vehicle 2 is moved over a street or road 46 to position its hose reel 40 and flexible vacuum conduit 36 over or closely adjacent an open manhole top 48 of the catch basin 38 having sewer laterals 50 radiating generally horizontally therefrom. The discharge hose 42 is unwound from the hose reel 40 to lower the nozzle 44 into the bottom region of the catch basin 38. The hose reel 40 may be driven by a hydraulic winch (not shown) from a power take-off (not shown) on the vehicle 2; alternatively, the auxiliary engine 18 may drive the winch.

The nozzle 44 is positioned into one of the sewer laterals 50 with a guiding tool 52, and water is pumped through the discharge hose 42 from a truck engine driven water pump (not shown) supplied by the water tank 6 to form a rearwardly directed water spray 54 from the nozzle 44 to propel forwardly the nozzle 44 through the sewer lateral 50; alternatively, the water pump (not shown) may be driven by the auxiliary engine 18.

When the nozzle 44 reaches a desired position in the sewer lateral 50, such as at or near a next adjacent catch basin connection to the catch basin 38, a winding winch (not shown) for the hose reel 40 is activated to retract the discharge hose 42 back through the sewer lateral 50 and catch basin 38, dragging the nozzle 44 therewith while the water spray 54 continues to flow. This effects a backwashing of the sewer lateral 50, where debris is flushed out of the sewer lateral 50 with the water spray 54 into the catch basin 38. To prevent the flushed debris from flowing out of the catch basin 38 through another sewer lateral 50, the other sewer laterals 50 have their catch basin entranceways each covered with a screen plug 56, which will only accommodate flow of liquids out of the catch basin 38. Conveniently, prior to the start of the operation referred to above in relation to the nozzle 44, extension conduits 58 are mounted on the free end of the flexible conduit 36 to depend therefrom into the bottom of the catch basin 38. Thus, at the time retraction of the discharge hose 42 commences, the exhaust fan 20 is energized (either via the auxiliary engine 18 or a power take-off from the vehicle engine) to pull air through the flexible vacuum conduit 36 and the container 8, thereby creating a partial vacuum in the container 8 and an associated air stream through the conduit 36 which causes the debris to flow out of the bottom of the catch basin 38 into the container 8. Such operation readily permits the simultaneous cleaning of both the sewer lateral and the catch basin. Alternatively, when it is desired to clean the sewer lateral and the catch basin in a consecutive fashion, that can also be accomplished by fully retracting the discharge hose 42 before the exhaust fan 20 is energized.

After the completion of this operation, the water collected in the container 8 may be discharged into the catch basin 38 from a water drain outlet 60 along the bottom of the container 8, leaving only solid debris in the container 8. Upon completion of the water draining operation, and when the container 8 is full of solid debris, the vehicle 2 is driven to a dumping area and dumped by unlatching the latches 16 along the rear wall of the container 8, and raising the front end of the container 8 with the lift mechanism 10.

It should be appreciated that the above discussion with reference to FIG. 1 is for background purposes in relation to the cleaning of catch basins and sewer laterals. As such, the hose reel there depicted suffers from the disadvantages of the prior art. For example, such hose reel is fixedly mounted to the frame of the vehicle 2 and can neither be laterally displaced from the vehicle nor pivoted about a transverse axis.

Figure 2:
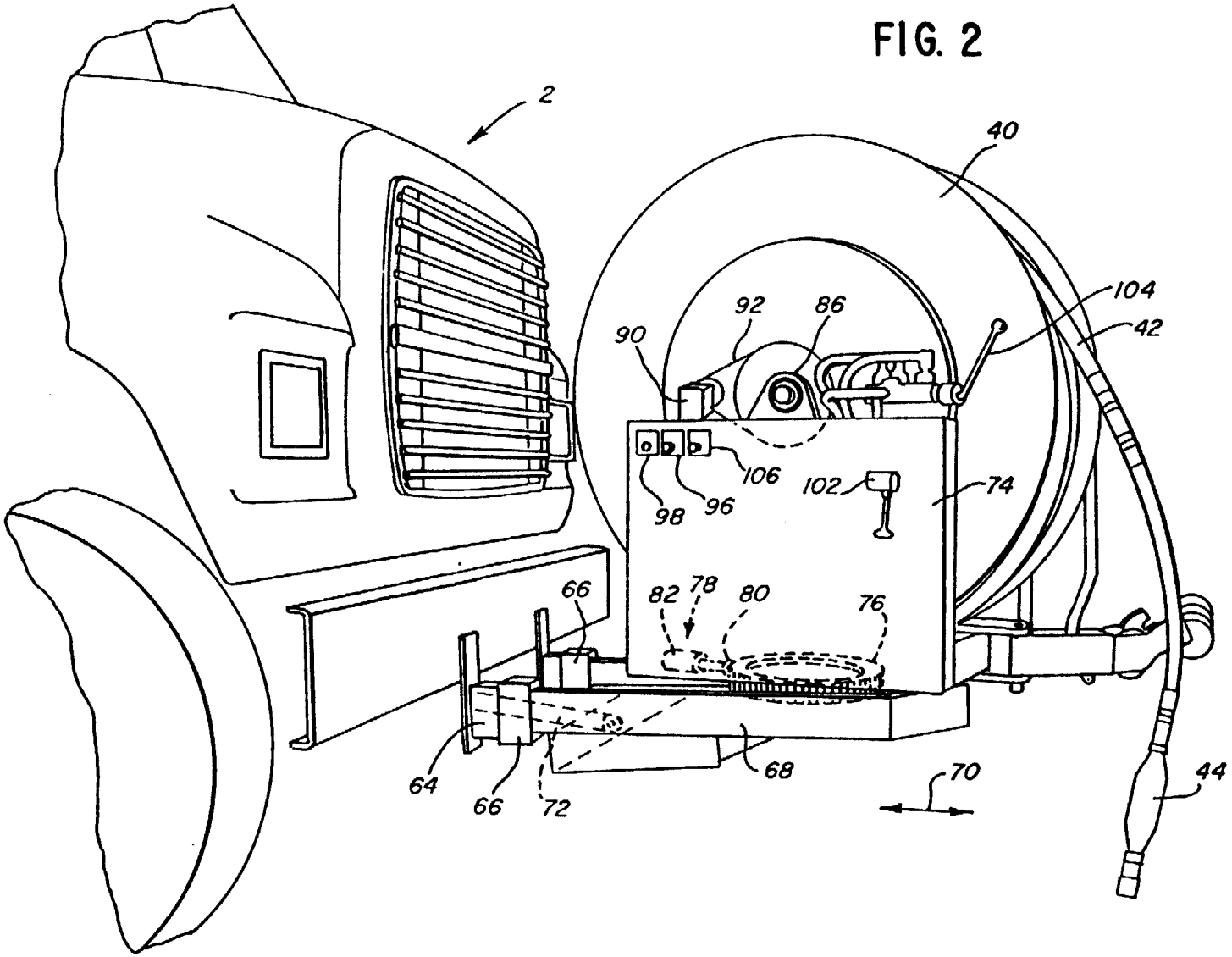
FIG. 2 is a partial perspective view of the present invention with a hose reel mounted on the nose of the sewer cleaning vehicle shown in FIG. 1.
Figure 7:
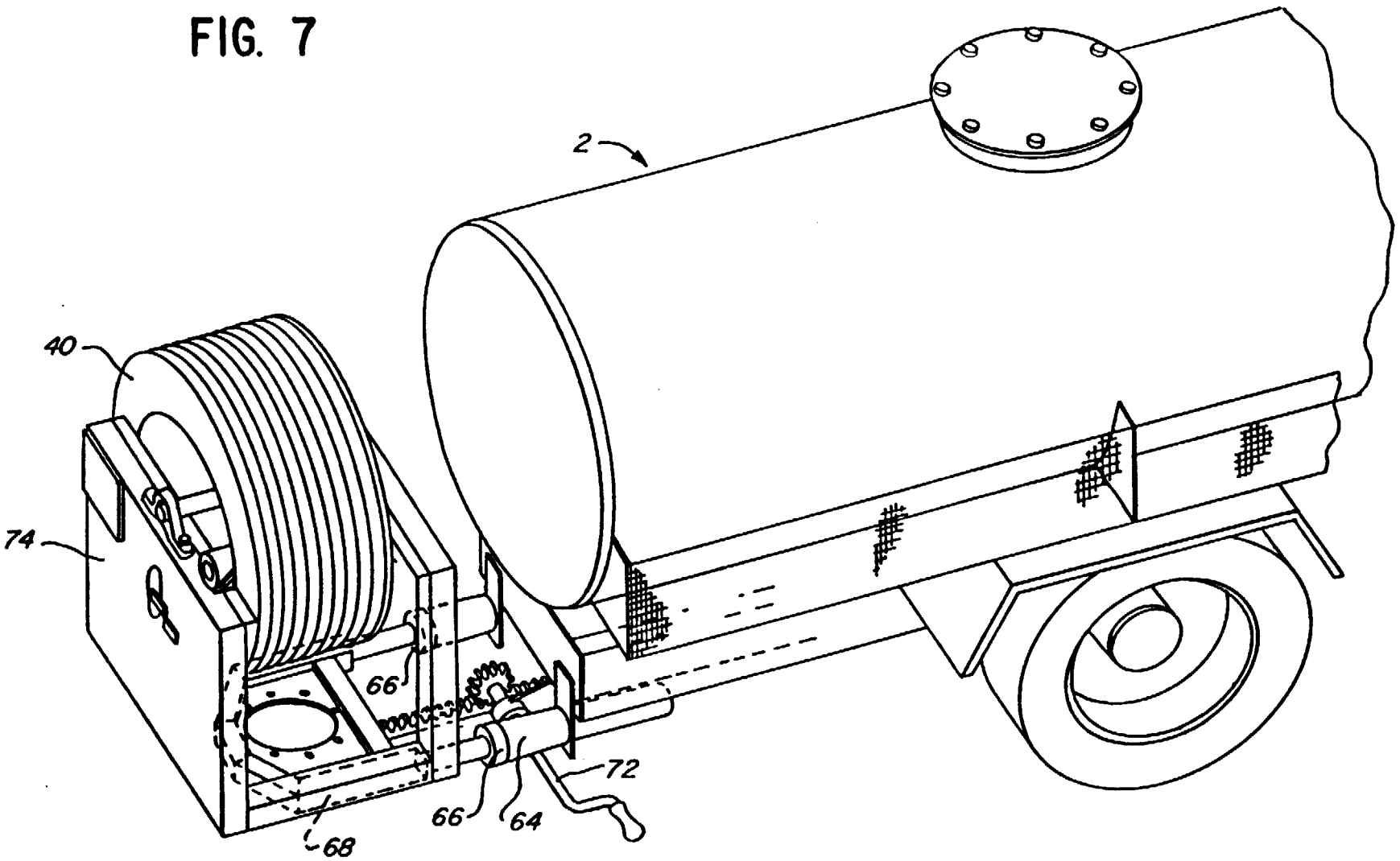
FIG. 7 is a partial perspective view of the present invention with a hose reel mounted on the tail of the sewer cleaning vehicle shown in FIG. 1.

On the other hand, FIG. 2 illustrates how the sewer cleaning vehicle 2 advantageously incorporates the present invention in conjunction with the system used to clean catch basins and sewer laterals as described above. The vehicle 2 includes a frame support bracket 64. Although the frame support bracket 64 is shown mounted to the nose of the vehicle 2, the frame support bracket 64 can be mounted with equal facility to the tail or either side of the vehicle 2 in a similar fashion. Such a tail mounted arrangement is shown in FIG. 7.

The frame support bracket 64 includes at least two linear bearings 66 extending generally away from the vehicle 2 and substantially parallel to the ground on which the vehicle 2 rests. The linear bearings 66 have axes substantially parallel with respect to each other. A hose reel support base 68 is slidably engaged by the linear bearings 66 to the permit lateral movement toward and away from the vehicle 2 in the directions indicated by double headed directional arrow 70. Although the linear bearings 66 and the mounting surfaces of the support base 68 are shown with a rectilinear axial cross section, they may be of any other useful shape, such as curvilinear, for example. The bearings 66 are shown with a curvilinear configuration in FIG. 7. A lateral positioner 72, connected between the support base 68 and the vehicle 2, provides powered lateral displacement of the support base 68 relative to the vehicle 2. *The lateral positioner 72 may be mounted as convenient to the support base 68 and the vehicle 2 and may be locationally related to the vehicle 2 and its frame in only desired manner which achieves the objectives of the present invention, as described hereafter. Preferably, the lateral positionor 72 is generally at or below the level of the majority of the frame of the vehicle 2, as shown in FIGS. 2, 3, 5 and 7. This permits a portion of the positioner 72 to be hidden beneath the vehicle 2, if desired.* Although shown in FIG. 2 as a hydraulic [cylinder,] *piston-cylinder with most of the cylinder being hidden by the front of the vehicle,* the positioner 72 may be any convenient positioning device, such as a pneumatic [cylinder] *piston-cylinder* or electric motor [.] *, partially or entirely hidden or not hidden at the front, rear or side of the vehicle 2.*

Alternatively, the support base 68 may be positioned manually, with a manual operator, for instance. The positioner 72 is shown as a manual operator in FIG. 7.

A hose reel alignment bracket 74 is rotationally mounted on the support base 68 with a rotationally bearing assembly 76. The rotational bearing assembly 76 positions the alignment bracket 74 to permit the alignment bracket 74 to revolve about an alignment bracket rotational axis substantially transverse to the ground on which the vehicle 2 rests, and also transverse to the axis of motion for the support base 68 represented by the directional arrow 70. Although shown in FIG. 2 as a bearing assembly with concentric ring races, and which may typically include a ball bearing inner raceway, the rotational bearing assembly 76 may also conveniently assume other bearing assembly configurations, such as circular ways or journal and sleeve.

The rotational bearing assembly 76 may include a concentric set of gear teeth about its perimeter, as shown in FIG. 2, to serve as a convenient surface to lock the alignment bracket 74 in a desired position with a locking assembly 78. The locking assembly 78 includes a gear rack 80 which may be locked against gear teeth of the rotational bearing assembly 76 with a locking operator 82. Although shown as a pneumatic cylinder, the locking operator 82 may also conveniently be another type operator, such as hydraulic, electric, or manual.

The gear teeth about the perimeter of the rotational bearing assembly 76 may also serve as a convenient surface to rotationally position the alignment bracket 74 with a rotational operator (not shown), such as, for example, a motor. The rotational operator may have a selectively driven gear or gear rack which engages with the geared surface of the rotational bearing assembly 76 to rotationally position the alignment bracket 74 as desired.

The discharge hose storage reel 40 is rotationally mounted on the alignment bracket 74 with at least one hose reel bearing assembly 86. One of the hose reel bearings 86 may be conveniently attached to the hose reel 40 on each end to allow the hose reel 40 to revolve about a hose reel axis substantially transverse to the alignment bracket rotational axis with the alignment bracket rotational axis substantially intersecting the hose reel axis between the ends of the hose reel. Although the alignment bracket axis is shown to substantially bisect the hose reel 40 along its axis in FIG. 2, the alignment bracket axis may be aligned to substantially intersect the hose reel axis at any convenient point between the ends of the hose reel 40. When the alignment bracket axis is so shifted, the hose reel 40 will pivot eccentrically about the alignment bracket axis as the alignment bracket 74 is rotated, which may be convenient for certain installations. The discharge hose 42, wound about the hose reel axis of the hose reel 40, is thus conveniently dispensed and retrieved over a wide range of laterally and radially displaced positions from the vehicle 2 by appropriately extending the support base 68 in combination with rotating the alignment bracket 74.

The hose reel 40 is conveniently rotated for hose dispensal and retrieval with a hose reel motor 90 which drives the hose reel 40. Although the hose reel motor 90 is shown coupled to the hose reel 40 with a hose reel chain 92, the motor 90 can drive the hose reel 40 directly, or with a variety of other coupling arrangements, such as gear or belt drive. Although the motor 90 is shown as the hydraulic type, for ease of speed regulation, other types of motors may be used as well, such as pneumatic or electric.

Figure 3:
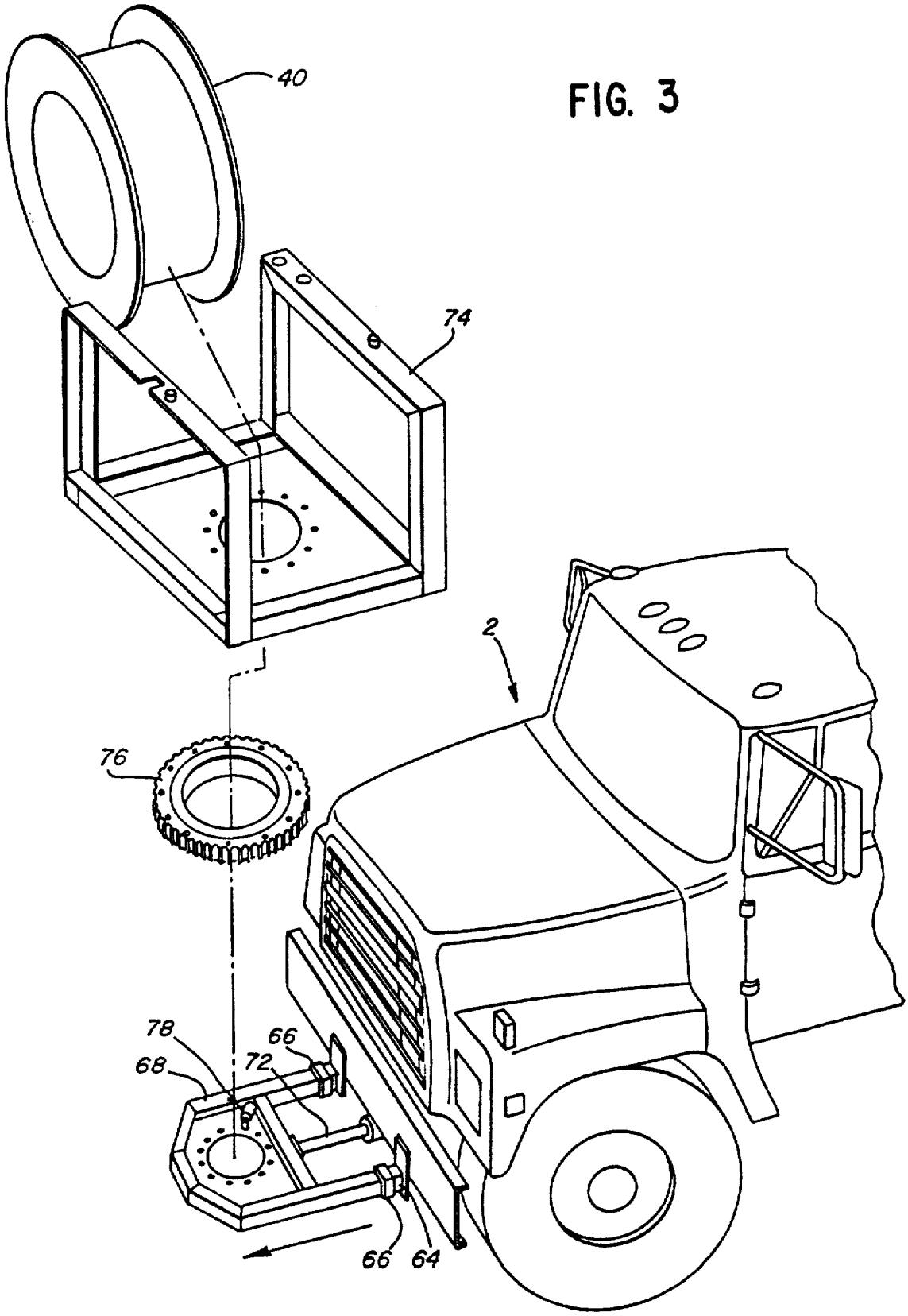
FIG. 3 is an exploded partial perspective view of FIG. 2.

FIG. 3 is an exploded partial perspective view of the major components for the preferred embodiment of the present invention described above in connection with FIG. 2. The lateral positioner 72 is mounted between the support base 68 and the vehicle 2 to provide a lateral displacement of the support base 68, as described above. *The positioner 72 may be located and oriented, and may be partially hidden by the vehicle 2 and/or its frame, so as to achieve the desired lateral displacement.* The rotational bearing assembly 76 is mounted between the support base 68 and the alignment bracket 74 to provide rotational alignment for the hose reel 40, which mounts within the alignment bracket 74, as has been described. The locking assembly 78 is mounted on the support base 68 to lockingly engage the perimeter of the rotational bearing assembly 76 to maintain the alignment bracket 74 in a desired rotational position.

Figure 4:
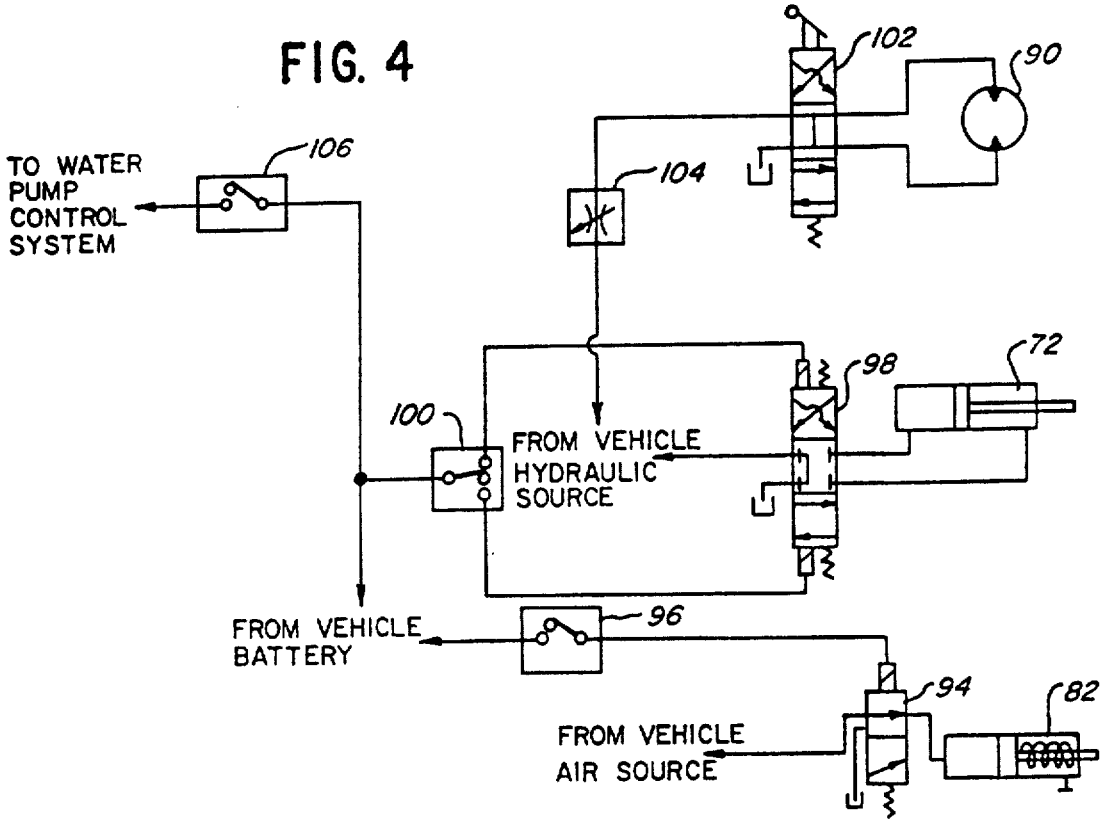
FIG. 4 is a schematic of the control system useful in the present invention.

The preferred embodiment may also include a system for controlling the various powered functions of the sewer cleaning vehicle 2 described above. A general schematic diagram of a suitable control system for the vehicle 2 is shown in FIG. 4. The locking assembly 78 is operated to lock the hose reel alignment bracket 74 in any desired position with a lock control valve 94. Although the lock control valve 94 is shown as of the solenoid operated pneumatic control type, others, such as a manually operated valve, can be substituted. An electric lock control switch 96 selectively operates the solenoid operator of the lock control valve 94, thereby engaging and disengaging the locking assembly 78 to control rotational movement of the hose reel 40 in the alignment bracket 74.

Of course, the controls for the above described control system may be duplicated and mounted on each side of the alignment bracket 74. The controls are thus connected in tandem to provide convenient operation of the control system regardless of the rotational position of the hose reel 40.

The lateral positioner 72 is operated to slide the hose reel support base to any selected position with a lateral position control valve 98. Although the lateral position control valve 98 is shown as of the solenoid operated hydraulic type, others, such as a manually operated valve, can be substituted. An electrical lateral position control switch 100 selectively operates the solenoid operator of the lateral position control valve 98 to laterally extend and retract the hose reel support base 68.

The hose reel motor 90 is operated to control the direction of rotation for the hose reel 40 by a rotation direction control valve 102. Although shown as a manually operated hydraulic direction control valve, the rotation direction control valve 102 can also be a solenoid operated type, if a suitable control switch is added. The hose reel motor 90 is operated to control the speed of rotation for the hose reel 40 by a rotation speed control valve 104. Although the rotation speed control valve 104 is shown as manually operated hydraulic flow control valve, an electrically operated flow control valve can be substituted with a suitable electric controller.

A water pump control 106 may be provided for control of the discharge of water through the discharge hose 42. Although the pump control 106 is shown as an electric switch for control of an electric pump control system (not shown), another type of operator, such as a manually operated hydraulic or pneumatic control valve, may be substituted for a hydraulic or pneumatic operated system, respectively.

Figure 5:
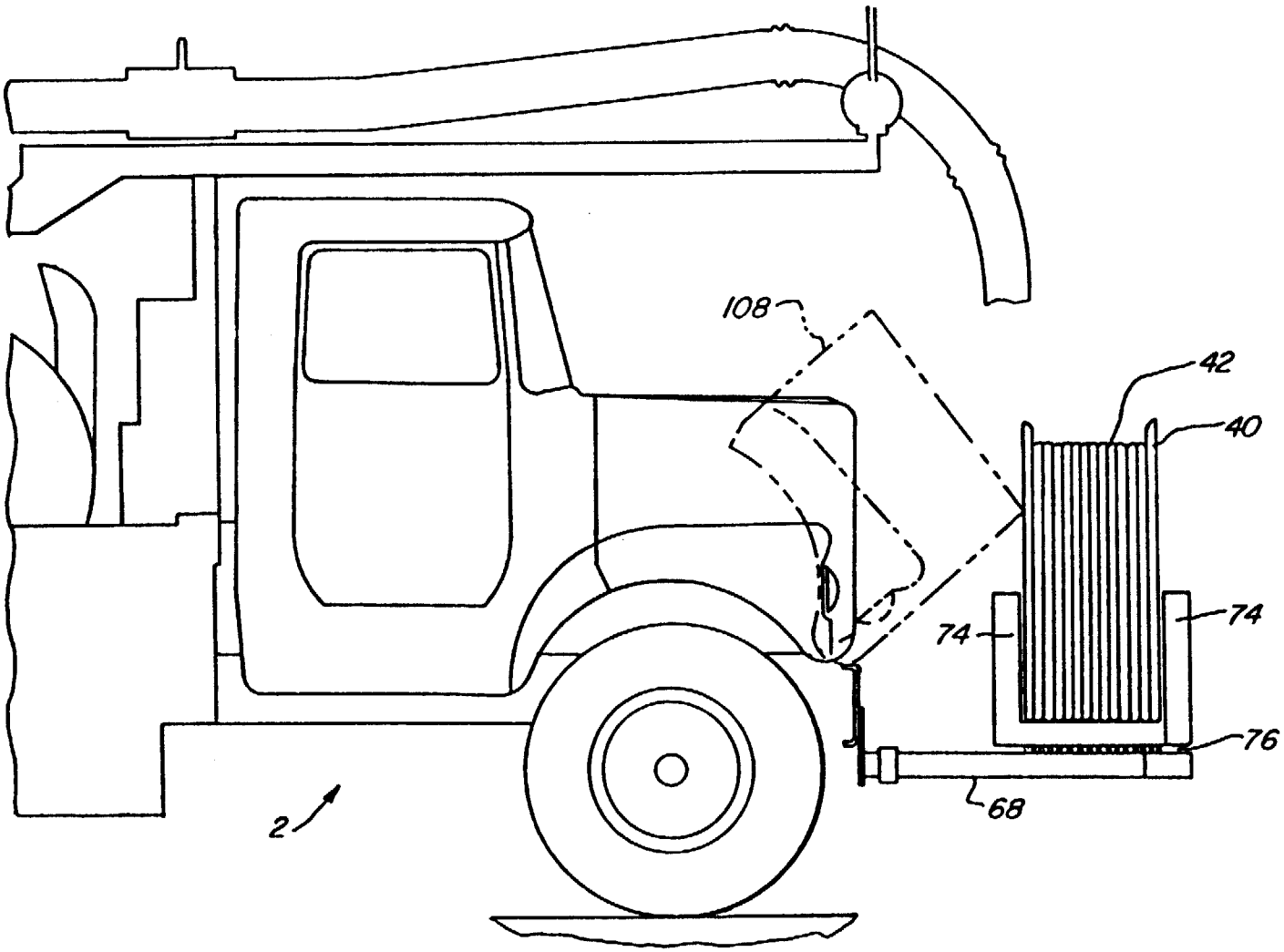
FIG. 5 is a typical partial side view of the embodiment shown in FIG. 1, illustrating how the present invention allows vehicle access for maintenance.

FIG. 5 shows how the support base 68 and the alignment bracket 74 of the preferred embodiment described above may be oriented to enhance vehicle access for maintenance. The support base 68 is fully extended away from the vehicle 2 and the alignment bracket 74 is rotated to position the hose reel 40 with its rotational axis aligned with the length of the vehicle 2. A vehicle nose cover 108, shown as a typical front hinged truck engine compartment hood in FIG. 5, may then easily swing forward clear of the hose reel 40 for engine inspection and maintenance. Of course, in certain instances the cover 108 may be what is generally referred to as a cabover.

Figure 6:
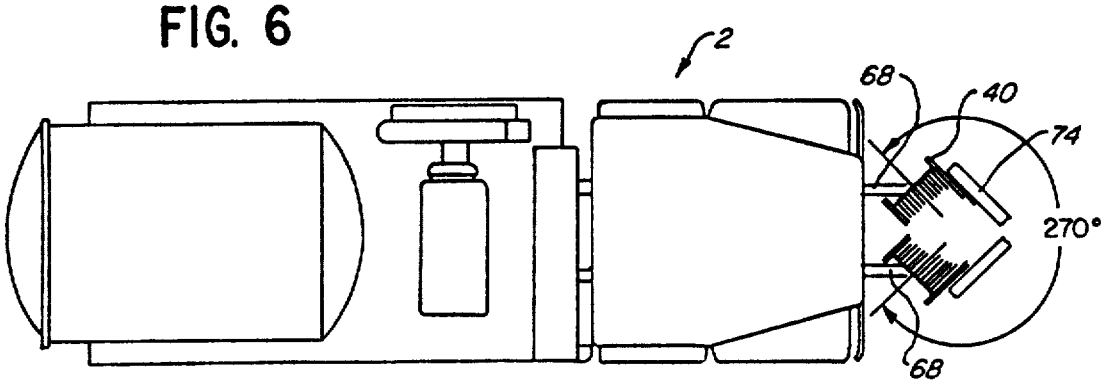
FIG. 6 is a diagrammatical representation of the hose dispensal and retrieval range for the embodiment shown in FIG. 1.

FIG. 6 is a diagrammatical representation of the dispensal and retrieval range of adjustment for the discharge hose 42 as described above. Shown is generally a top view of the vehicle 2 with the hose reel 40 mounted along the nose of the vehicle 2. It is evident that the hose reel 40 may be rotated in the range of 270 degrees, limited only by clearance with the nose of the vehicle. It is understood that with sufficient length of the lateral positioner 72, thereby providing clearance from the nose of the vehicle, the hose reel 40 may rotate a full 360 degrees.

It will be understood that various changes in the detail arrangements and configurations of the parts and assemblies which have been described and illustrated above in order to explain the nature of the present invention may be made by those skilled in the art within the principle and scope of the invention as expressed in the appended claims.

Furthermore, it will be appreciated that while the invention has been described with reference to sewer laterals and catch basins, the invention is equally useful in respect of sewer lines and manholes or other access points to laterals and lines.

What is claimed is:

[1. A method of supporting a portable discharge hose storage reel from a vehicle, comprising the steps of:

supporting a discharge hose storage reel adjacent the frame of said vehicle, with said hose storage reel having an associated lateral positioner positioned below the frame of said vehicle, and said hose storage reel having rotational freedom of movement about the axis of said hose reel and along a pivotal axis substantially transverse to and substantially intersecting said hose reel axis between the ends of said hose reel; and mounting said hose reel pivotal axis in a laterally displaceable position relative to said vehicular support platform.]

[2. The method recited in claim 1, wherein said step of mounting includes mounting said hose reel pivotal axis with a pivotal axis freedom of movement substantially transverse to said hose reel pivotal axis between said hose reel pivotal axis and said vehicular support platform. ]

[3. The method recited in claim 2, wherein said step of mounting includes mounting said hose reel pivotal axis with said pivotal axis freedom of movement substantially in line with said pivotal axis.]

[4. The method recited in claim 1, wherein said step of supporting includes the step of aligning said hose reel axis substantially parallel to the plane of said support platform.]

[5. The method recited in claim 1, wherein said step of mounting further includes the step of aligning said pivotal axis substantially transverse to the plane of said support platform.]

6. Apparatus for supporting a portable discharge hose storage reel from a vehicle, *the reel being rotatable about an axis of rotation,* comprising:

means for supporting [a] *the* discharge hose storage reel adjacent the frame of said vehicle [with said hose storage reel having an associated] *so that the reel and its axis of rotation are laterally movable toward and away from the vehicle; a* lateral positioner positioned below the frame of said vehicle [and said hose storage reel having rotational freedom of movement about the axis of said hose reel and along] *for selectively laterally moving the supporting means toward and away from the vehicle; and means for mounting the reel to the supporting means for pivoting the reel about* a pivotal axis substantially transverse to and substantially intersecting said hose reel axis *of rotation* between the ends of said hose reel [; and means for mounting said hose reel pivotal axis in a laterally displaceable position relative to said vehicular support platform].

[7. The apparatus recited in claim 6, wherein said means for mounting includes means for mounting said hose reel pivotal axis with a pivotal axis freedom of movement substantially transverse to said hose reel pivotal axis between said hose reel and said vehicular support platform.]

[8. The apparatus recited in claim 7, wherein said means for mounting further includes means for mounting said hose reel pivotal axis with said pivotal axis freedom of movement substantially in line with said pivotal axis.]

9. The apparatus recited in claim 6, wherein said means for supporting further includes means for aligning said hose reel axis substantially parallel to the plane of [said support platform] *the ground.*

10. The apparatus recited in claim 9, wherein said means for aligning said hose reel axis includes a hose reel alignment bracket attached to said hose reel with rotational freedom of movement of said hose reel about said hose reel axis.

11. The apparatus recited in claim 10, wherein said means for mounting further includes a hose reel support base and said hose reel alignment bracket is attached to said hose reel support base with rotational freedom of movement about said pivotal axis.

12. The apparatus recited in claim 11, wherein said means for [aligning said hose reel axis] *mounting* further includes a hose reel rotation bearing for providing said rotational attachment between said hose reel alignment bracket and said hose reel support base.

13. The apparatus recited in claim 12, wherein said means for [mounting] *supporting* further includes a frame support bracket fixed to said [vehicular support platform] *vehicle* which slidably engages said hose reel support base along the direction of said pivotal axis freedom of movement.

14. The apparatus recited in claim 13, wherein said means for [mounting] *supporting* further includes at least one linear bearing for providing said slidable engagement between said frame support bracket and said hose reel support base.

15. The apparatus recited in claim 14, wherein each said linear bearing includes a rectangular [axial] cross section.

16. The apparatus recited in claim 13, wherein said means for [mounting] *supporting* further includes two linear bearings with their respective axes substantially parallel with each other for providing said slidable engagement between said frame support bracket and said hose reel support base.

17. The apparatus recited in claim [13,] *14,* wherein each said linear bearing includes a curvilinear [axial] cross section.

18. The apparatus recited in claim 13, wherein [said means for mounting further includes a] *the* lateral positioner [for sliding] *slides* said hose reel support base relative to said frame support bracket to position said pivotal axis.

19. The apparatus recited in claim 8, wherein said lateral positioner includes a [single ended hydraulic cylinder] *hydraulic piston-cylinder.*

20. The apparatus recited in claim 18, wherein said lateral positioner includes a [single ended pneumatic cylinder] *pneumatic piston-cylinder.*

21. The apparatus recited in claim 18, wherein said lateral positioner includes an electric motor.

22. The apparatus recited in claim 18, wherein said lateral positioner includes a manual operator.

23. The apparatus recited in claim 13, wherein said means for supporting further includes at least one rotational bearing for providing said rotatable attachment between said hose reel and said alignment bracket.

24. The apparatus recited in claim 13, wherein said means for supporting includes two rotational bearings, with each said bearing providing said rotational attachment of a respective axial end of said hose reel to said alignment bracket.

25. The apparatus recited in claim 6, wherein said means for mounting further includes means for aligning said pivotal axis substantially transverse to the plane of [said support platform] *the ground.*

26. Apparatus for supporting a discharge hose storage reel for a water spray system on the nose of a ground traveling sewer cleaning vehicle, comprising:

a frame support bracket attached to said vehicle nose and extending away from said vehicle nose, including two linear bearings below the frame of said vehicle having axes substantially parallel to the ground and to each other;

a hose reel support base, including members slidably engaged in said linear bearings below said vehicle frame, having freedom of movement toward and away from said vehicle nose;

a [lateral] positioner, mounted below said vehicle frame, for [positioning] *moving* said hose reel support base [relative to] *toward and away from* said vehicle nose;

a hose reel alignment bracket attached to said hose reel support base, including a rotational bearing for permitting rotational movement of said alignment bracket on said support base [along] *about* a pivotal axis transverse to the ground; and a hose reel, rotatably mounted on said alignment bracket, including rotational bearings on each end of said hose reel [along] *about* a rotational axis of said hose reel substantially transverse to said pivotal axis, with said pivotal axis substantially intersecting said rotational axis between said hose reel ends.

27. A vehicle for removing debris from a catch basin while simultaneously cleaning sewer laterals leading from the catch basin which comprises a truck having a water tank, a debris collecting container, a positionable conduit leading from the [front end of the said] container over said vehicle, a tailgate on the [rear end of said] container adapted to be opened to discharge debris from said container and adapted to be closed to seal said container, a hose reel adjacent said vehicle having a hose wound thereon with a nozzle on the leading end thereof for receiving water from said water tank, a motor driven fan continuously pulling air from said container and said conduit for conveying debris from said catch basin through said conduit into the container, a water pump for discharging water from said water tank through said hose to propel said hose and said nozzle into a sewer pipe and to wash debris from said sewer pipe into said catch basin for said removal through said conduit into said container, and comprising:

a frame support bracket attached to said vehicle and extending away from said vehicle, including two linear bearings below the frame of said vehicle having axes substantially parallel to the ground and to each other;

a hose reel support base, including members slidably engaged in said linear bearings below said vehicle frame, having freedom of movement toward and away from said vehicle;

a [lateral] positioner, mounted below said vehicle frame, for [positioning] *moving* said hose reel support base [relative to] *toward and away from* said vehicle;

a hose reel alignment bracket attached to said hose reel support base, including a rotational bearing for permitting rotational movement of said alignment bracket on said support base [along] *about* a pivotal axis transverse to the ground; and supporting means, for rotatably supporting said hose reel on said alignment bracket [along] *about* a rotational axis of said hose reel substantially transverse to said pivotal axis, with said pivotal axis substantially intersecting said rotational axis between the ends of said hose reel.

28. A vehicle for cleaning sewer laterals leading from a catch basin which comprises a truck having a water tank, a debris collecting container, a positionable conduit leading from said container, a tailgate on the [rear end of said] container adapted to be opened to discharge debris from said container and adapted to be closed to seal said container, a hose reel adjacent said vehicle having a hose wound thereon with a nozzle on the leading end thereof for receiving water from said water tank, a motor driven fan continuously pulling air from said container and said conduit for conveying debris from said catch basin through said conduit into the container, a water pump for discharging water from said water tank through said hose to propel said hose and said nozzle into a sewer pipe and to wash debris from said sewer pipe into said catch basin for said removal through said conduit into said container, and comprising:

a frame support bracket attached to said vehicle and extending away from said vehicle, including two linear bearings below the frame of said vehicle having axes substantially parallel to the ground and to each other;

a hose reel support base, including members slidably engaged in said linear bearings below said vehicle frame, having freedom of movement toward and away from said vehicle;

a [lateral] positioner, mounted below said vehicle frame, for [positioning] *moving* said hose reel support base [relative to] *toward and away from* said vehicle;

a hose reel alignment bracket attached to said hose reel support base, including a rotational bearing for permitting rotational movement of said alignment bracket on said support base [along] *about* a pivotal axis transverse to the ground; and supporting means, for rotatably supporting said hose reel on said alignment bracket [along] *about* a rotational axis of said hose reel substantially transverse to said pivotal axis, with said pivotal axis substantially intersecting said rotational axis between the ends of said hose reel.

29. The vehicle recited in claim 27, wherein said hose reel mounting means includes rotational bearings [axially] attached to each end of said hose reel.

30. The vehicle recited in claim 27, wherein each said linear bearing includes a rectangular [axial] cross section.

31. The vehicle recited in claim 27, wherein each said linear bearing includes a curvilinear [axial] cross section.

32. The vehicle recited in claim 27, wherein said lateral positioner includes a [single ended hydraulic cylinder] *hydraulic piston-cylinder.*

33. The vehicle recited in claim 27, wherein said lateral positioner includes a [single ended pneumatic cylinder] *pneumatic piston-cylinder.*

34. The vehicle recited in claim 27, wherein said lateral positioner includes an electric motor.

35. The vehicle recited in claim 27, wherein said lateral positioner includes a manual operator.

36. The vehicle recited in claim 27, wherein said frame support bracket extends from the nose of said vehicle.

37. The vehicle recited in claim 27, wherein said frame support bracket extends from the tail of said vehicle in cooperating relation with said tailgate.

38. The vehicle recited in claim 28, wherein said hose reel mounting means includes rotational bearings [axially] attached to each end of said hose reel.

39. The vehicle recited in claim 28, wherein each said linear bearing includes a rectangular [axial] cross section.

40. The vehicle recited in claim 28, wherein each said linear bearing includes a curvilinear [axial] cross section.

41. The vehicle recited in claim 28, wherein said lateral positioner includes a [single ended hydraulic cylinder] *hydraulic piston-cylinder.*

42. The vehicle recited in claim 28, wherein said lateral positioner includes a [single ended pneumatic cylinder] *pneumatic piston-cylinder.*

43. The vehicle recited in claim 28, wherein said lateral positioner includes an electric motor.

44. The vehicle recited in claim 28, wherein said lateral positioner includes a manual operator.

45. The vehicle recited in claims 28, wherein said frame support bracket extends from the nose of said vehicle.

46. The vehicle recited in claim 28, wherein said frame support bracket extends from the tail of said vehicle in cooperating relation with said tailgate.

*47. Apparatus for mounting a hose reel on a vehicle, the hose reel being rotatable about an axis of rotation, which apparatus comprises:*

*a support base,*

*first means for mounting the support base to the exterior of the vehicle for selective movement thereof along a line of direction toward and away from the vehicle,*

*second means for mounting the reel to the base for rotation of the reel above the base about the axis of rotation, which axis of rotation is generally parallel to the line of direction of support base movement relative to the vehicle, and* third means for permitting selective turning of the reel-*to-base mounting means on the base, such turning occurring about an axis which is generally perpen-*

*dicular to the axis of rotation of the reel and to the line of direction of support base movement.*

*48. Apparatus as in claim 47, wherein:*

*the first means is located at least partially below the vehicle.*

*49. Apparatus as in claim 47, wherein:*

*the first means is mounted to the frame of the vehicle.*

*50. Apparatus as in claim 47, wherein:*

*the first means is located at least partially below the frame of the vehicle.*

*51. Apparatus as in claim 47, wherein:*

*the first means includes a piston-cylinder, one member of which engages the vehicle while the other member engages the support base.*

*52. Apparatus as in claim 51, wherein:*

*the one member of the piston-cylinder engages the frame of the vehicle.*

*53. Apparatus as in claim 52, wherein:*

*the one member is located at least partially below the vehicle frame.*

*54. Apparatus as in claim 53, wherein:*

*the one member is the cylinder of the piston-cylinder.*

* * * * *